United States Patent
Bohsmann et al.

(10) Patent No.: US 12,071,692 B2
(45) Date of Patent: Aug. 27, 2024

(54) ELECTRICALLY CONDUCTING MATERIAL WITH COATING

(71) Applicant: WIELAND-WERKE AG, Ulm (DE)

(72) Inventors: Michael Bohsmann, Dettingen (DE); Robert Zauter, Neu-Ulm (DE)

(73) Assignee: WIELAND-WERKE AG, Ulm (DE)

( * ) Notice: Subject to any disclaimer, the term of this patent is extended or adjusted under 35 U.S.C. 154(b) by 0 days.

(21) Appl. No.: 18/040,169

(22) PCT Filed: Dec. 21, 2020

(86) PCT No.: PCT/EP2020/000215
§ 371 (c)(1),
(2) Date: Feb. 1, 2023

(87) PCT Pub. No.: WO2022/073575
PCT Pub. Date: Apr. 14, 2022

(65) Prior Publication Data
US 2023/0265549 A1    Aug. 24, 2023

(30) Foreign Application Priority Data

Oct. 5, 2020    (DE) .................. 10 2020 006 059.5

(51) Int. Cl.
*C23C 28/00* (2006.01)
*B32B 15/01* (2006.01)
(Continued)

(52) U.S. Cl.
CPC ............... *C23C 2/08* (2013.01); *B32B 15/01* (2013.01); *B32B 15/04* (2013.01); *B32B 15/043* (2013.01);
(Continued)

(58) Field of Classification Search
CPC ..... C23C 30/00; C23C 30/005; C23C 28/023; C23C 28/027; C23C 28/021; C23C 2/08;
(Continued)

(56) References Cited

U.S. PATENT DOCUMENTS

| 5,075,176 A | 12/1991 | Brinkmann |
| 5,849,424 A | 12/1998 | Sugawara et al. |

(Continued)

FOREIGN PATENT DOCUMENTS

| DE | 112012006189 T5 | 12/2014 |
| EP | 0443291 A2 | 8/1991 |

(Continued)

OTHER PUBLICATIONS

International Search Report with English Translation issued in corresponding International Application No. PCT/EP2020/000215 date of mailing Jun. 15, 2021 (9 pages).

(Continued)

*Primary Examiner* — Michael E. La Villa
(74) *Attorney, Agent, or Firm* — FLYNN THIEL, P.C.

(57) ABSTRACT

An electrically conducting material including a substrate composed of copper or a copper alloy, and a coating composed of at least one layer. The coating has an outermost layer consisting to an extent of at least 90 vol % of an intermetallic phase which is or includes $Cu_6Sn_5$. The surface of the outermost layer that faces away from the substrate has insular, silver-rich precipitations with an area fraction of 7 to 20%.

6 Claims, 2 Drawing Sheets

(51) Int. Cl.
*B32B 15/04* (2006.01)
*B32B 15/20* (2006.01)
*C22C 9/00* (2006.01)
*C22C 9/02* (2006.01)
*C22C 13/00* (2006.01)
*C22C 30/02* (2006.01)
*C22C 30/04* (2006.01)
*C22F 1/08* (2006.01)
*C23C 2/08* (2006.01)
*C23C 28/02* (2006.01)
*C23C 30/00* (2006.01)

(52) U.S. Cl.
CPC ............... *B32B 15/20* (2013.01); *C22C 9/00* (2013.01); *C22C 9/02* (2013.01); *C22C 13/00* (2013.01); *C22C 30/02* (2013.01); *C22C 30/04* (2013.01); *C22F 1/08* (2013.01); *C23C 28/021* (2013.01); *C23C 28/023* (2013.01); *C23C 28/027* (2013.01); *C23C 30/00* (2013.01); *C23C 30/005* (2013.01); *Y10T 428/12431* (2015.01); *Y10T 428/12438* (2015.01); *Y10T 428/12896* (2015.01); *Y10T 428/12903* (2015.01); *Y10T 428/1291* (2015.01)

(58) Field of Classification Search
CPC ... C22F 1/08; C22C 13/00; C22C 9/00; C22C 9/02; C22C 30/02; C22C 30/04; B32B 15/01; B32B 15/04; B32B 15/043; B32B 15/20; Y10T 428/12903; Y10T 428/1291; Y10T 428/12896; Y10T 428/12438; Y10T 428/12431
See application file for complete search history.

(56) References Cited

U.S. PATENT DOCUMENTS

| | | |
|---|---|---|
| 6,207,035 B1 | 3/2001 | Adler et al. |
| 6,638,643 B2 | 10/2003 | Schleicher et al. |
| 6,641,930 B2 | 11/2003 | Schleicher et al. |
| 6,677,056 B2 * | 1/2004 | Tanaka ............... C22C 13/00 205/252 |
| 6,716,541 B2 | 4/2004 | Adler et al. |
| 9,755,343 B2 | 9/2017 | Sunaga et al. |
| 2021/0218171 A1 | 7/2021 | Cappi et al. |

FOREIGN PATENT DOCUMENTS

| | | |
|---|---|---|
| EP | 0919644 A1 | 6/1999 |
| EP | 1157820 A1 | 11/2001 |
| EP | 1158618 A2 | 11/2001 |
| EP | 1288321 A1 | 3/2003 |
| EP | 2386668 A1 | 11/2011 |
| WO | 2008157529 A2 | 12/2008 |
| WO | 2010061259 A1 | 6/2010 |
| WO | 2019224197 A1 | 11/2019 |

OTHER PUBLICATIONS

Written Opinion of International Searching Authority issued in corresponding International Application No. PCT/EP2020/000215 dated Jun. 15, 2021 (6 pages).
German Office Action issued in corresponding German Application No. 10 2020 006 059.5 date of mailing Jun. 8, 2021 (5 pages).

* cited by examiner

ELECTRICALLY CONDUCTING MATERIAL WITH COATING

BACKGROUND AND SUMMARY

The invention relates to an electrically conducting material having a coating. Such materials are used for the production of plug-in connectors.

The insertion forces and pulling forces associated respectively with the connecting and undoing of plug-in connectors are very important for the handling of the plug-in connectors. In the case of multi-pin plug-in connectors in particular, the additive effect of the forces of each individual terminal during the insertion procedure may mean that insertion can no longer be carried out by hand. It is therefore desirable to reduce the insertion forces to a minimum. As well as the design of the terminal, a decisive part is played here by the frictional relationships between the insertion partners.

Specific requirements arising from the fields of use of the plug-in connectors usually necessitate coating of the base materials—for example, to be able to produce the required electrical properties or maintain them over a prolonged time, or to protect the base material from corrosion. The most widespread layer systems consist on the basis of tin. Pure tin, however, has unfavorable frictional properties, resulting in high insertion forces and pulling forces. This deleterious property of tin is irrespective of whether the coating has been applied electrochemically or from the liquid-melt phase or in some other way.

The insertion forces can be reduced by minimizing the thickness of the layer of tin applied. The volume of the tin which is displaced before the contact zone during the insertion procedure and which hence generates an increased friction can be reduced by this means.

From the publication U.S. Pat. No. 5,849,424 A it is known that the hardness of a layer of tin applied on a copper material can be increased substantially by subjecting the coating to a heat treatment at a temperature in the range from 100 to 600° C. Owing to diffusion processes, intermetallic phases are formed at the interface between the substrate and the layer of tin, and these intermetallic phases grow over the course of time until the tin is completely consumed. At the surface of the coating there is then no longer any free tin. In the case of a substrate of copper material, intermetallic phases with the composition $Cu_3Sn$ and $Cu_6Sn_5$ are formed.

An alternative proposal in publication EP 0 443 291 A2, for increasing the hardness of a coating, is to apply a surface coating on the base material of a plug element by a liquid-melt route, said surface coating being composed of an alloy which as well as tin and optionally lead also contains up to a total of 10 wt % of at least one of the elements from the group of silver, aluminum, silicon, copper, magnesium, iron, nickel, manganese, zinc, zirconium, antimony, rhodium, palladium and platinum. These elements with tin form preferably solid solutions or intermetallic phases with a hardness greater than the hardness of tin.

Also known, from publication WO 2019/224 197 A1, are tin coatings which are applied to copper materials and which comprise the insoluble, precipitation-forming element silver in a fraction of 0.08 to 0.5 wt % in the form of an $Ag_3Sn$ phase. The $Ag_3Sn$ phase is present in the coating in particle sizes having a mean area of 0.01 to 0.03 $\mu m^2$. The specific composition of the coating brings about an improvement in the strength of adhesion of the coating on the substrate. The basis for the effect of improving the strength of adhesion is that the element silver with tin forms an intermetallic phase which reduces or suppresses the formation of the $Cu_3Sn$ phase.

The invention is based on the object of specifying a material for plug-in connectors with insertion forces and pulling forces that are reduced relative to the prior art, while at the same time having low electrical contact resistance.

The invention includes an electrically conducting material which comprises a substrate composed of copper or a copper alloy, and a coating composed of at least one layer. The coating has an outermost layer which consists to an extent of at least 90 Vol % of an intermetallic phase which is or comprises $Cu_6Sn_5$. According to the invention, the surface of the outermost layer that faces away from the substrate, i.e., the outer surface of the material, has insular, silver-rich precipitations which, based on the overall outer surface of the coating, occupy an area fraction of 7 to 20%, preferably up to 15%.

Silver-rich precipitations are precipitations of intermetallic phase in which the molar fraction of silver is more than 50%, preferably more than 70%. The precipitations may in particular have the composition $Ag_3Sn$.

The silver-rich precipitations are present in a form which may be described as insular. Insular in this context means that a plurality of individual, compact regions of silver-rich phase are present, which are surrounded by a different phase. The individual regions of silver-rich phase are predominantly spaced apart from one another. It is, however, not impossible for two or more such regions to border one another directly. The regions of silver-rich phase may have an approximately round or elliptical shape. It is, however, also possible for regions of silver-rich phase to have a shape which corresponds to a deformed circle or a deformed ellipse, or for them to have a shape with angles. The individual regions of silver-rich phase are surrounded by an intermetallic phase which is or comprises $Cu_6Sn_5$. This intermetallic phase may in particular contain small amounts of silver, in the form, for example, of intermetallic phase having the approximate composition $Cu_6Sn_5Ag_x$, where x is substantially smaller than 1.

The outermost layer of the coating may be preferably 0.5 to 5 $\mu m$ thick. The insular, silver-rich precipitations are located on that surface of the outermost layer that faces away from the substrate. Here they are embedded at least partly in the intermetallic phase surrounding them, in such a way that they are located in a zone which extends from the outer surface up to 50% of the thickness of the outermost layer, typically to a depth of up to 0.3 $\mu m$ into the intermetallic phase. Furthermore, the insular, silver-rich precipitations may at least partly be slightly raised above the surface of the intermetallic phase surrounding them. The insular, silver-rich precipitations may have a thickness, measured perpendicularly to the surface, of up to 1 $\mu m$, preferably 0.2 to 0.4 $\mu m$.

When the material described above is used for producing a plug-in connector, the relatively high fraction of silver-rich precipitations on the outer surface of the material has an influence on the interaction of the material with the material of the partner to the plug-in connector. The silver-rich precipitations produce a reduction in the insertion forces and pulling forces. Especially if the silver-rich precipitations are slightly raised, they are able to reduce the effective contact area between the partners and hence the effective frictional forces. A reduction in the insertion forces and pulling forces of up to 40% relative to the coating which does not have the large fraction of silver-rich precipitations at the surface, in accordance with the invention, can therefore be achieved.

A material described above may be produced by using hot-dip galvanization first to apply a coating of a tin-silver alloy to a substrate, in particular to a striplike substrate, composed of copper or a copper alloy. Hot-dip galvanization means that the coating is applied to the substrate from the liquid-melt phase. The silver fraction in the tin-silver alloy here is 1.5 to 10 wt %, preferably 2 to 6 wt %, more preferably not more than 5 wt %. The coated material is subsequently subjected to a heat treatment at a temperature between 160 and 200° C. The duration of the heat treatment is dependent on factors including the thickness of the coating and is between 10 and 200 hours.

Because silver is virtually insoluble in solid tin, in the coating composed of a tin-silver alloy and applied by hot-dip galvanization there are $Ag_3Sn$ precipitations in a tin matrix. The $Ag_3Sn$ precipitations are distributed finely and uniformly throughout the volume of the tin matrix. Their area fraction as a proportion of the outer surface of the coating, i.e. the surface of the outermost layer facing away from the substrate, corresponds to their volume fraction in the tin matrix immediately after the application of the layer. During the heat treatment of the coated material, copper from the substrate diffuses into the tin-silver coating and transforms the tin into intermetallic Cu—Sn phases, more particularly to $Cu_6Sn_5$. With advancing growth of the intermetallic Cu—Sn phases, the originally finely distributed $Ag_3Sn$ precipitations are displaced from the matrix and moved in front of the growth front of the intermetallic Cu—Sn phases. In this case the $Ag_3Sn$ precipitations coalesce and are therefore increased in size. In the state of the free tin transformed entirely into intermetallic phases, there are coarse $Ag_3Sn$ precipitations directly at the surface of the outermost layer that faces away from the substrate, whereas the volume of the coating beneath the outer surface of the coating is largely free of silver, thus containing at most residues of $Ag_3Sn$. As a result of the heat treatment, therefore, there is a depletion of $Ag_3Sn$ in the volume of the coating lying beneath the outer surface of the coating, and, consequently, there is a significant accumulation—that is, an increase in the concentration—of $Ag_3Sn$ immediately at the outer surface of the coating, and so after the heat treatment the area fraction of silver-rich precipitations at the surface is 7 to 20%.

The material is preferably tapelike or striplike.

In one embodiment of the invention, more than 50%, preferably at least 70%, of the area fraction of the insular, silver-rich precipitations may be formed by precipitations having a size of at least 0.4 µm. The size in this context means the diameter of a circle having an area equivalent to the area of an insular precipitation when the latter is viewed in a plan view onto the outer surface. In the case of this specific configuration of the invention, it is not impossible for there to be precipitations having a size of less than 0.4 µm on the outer surface of the coating. In this specific configuration of the invention, however, these smaller precipitations contribute only to a relatively small degree to the area fraction of 7 to 20%, relative to the precipitations having a size of at least 0.4 µm. Immediately after the hot-dip galvanization, there are fine $Ag_3Sn$ precipitations present, distributed uniformly throughout the volume, with a size of less than 0.5 µm, predominantly in fact less than 0.2 µm. The heat treatment causes the finely divided $Ag_3Sn$ precipitations to accumulate, and so larger precipitations are formed. The size of these precipitations is typically in the range from 0.4 to 5 µm. Precipitations of such size are particularly effective in reducing the insertion forces and pulling forces. Large precipitations can be raised further over the surface surrounding them than small precipitations. They are therefore able to reduce to a greater extent the effective contact area between the two partners in a plug-in connection. This embodiment of the invention may be achieved through suitable choice of the parameters of the heat treatment.

In the context of a further embodiment of the invention, there may be an interlayer between the outermost layer and the substrate that comprises a copper-rich intermetallic phase which in particular is or comprises $Cu_3Sn$. A phase is said to be copper-rich if its molar fraction of copper is more than 65%. In the case of copper or a copper alloy as the substrate, a copper-rich phase which is substantially $Cu_3Sn$ is formed in a heat treatment at the interface between copper and tin. The temperature and duration of the heat treatment influence not only the formation of this copper-rich phase but also the formation of the silver-rich precipitations at the outer surface of the coating. The existence of the interlayer composed of copper-rich phase therefore provides a degree of freedom which makes it possible to optimize the number and size of the silver-rich precipitations at the outer surface.

In the context of one specific configuration of this embodiment of the invention, the coating may consist of the interlayer and of the outermost layer with the insular, silver-rich precipitations. With this specific configuration of the invention there are no further layers in the coating. An advantage of this is that the coating is inexpensive by comparison with coatings which consist of more than these two layers.

In one advantageous embodiment of the invention, the fraction of silver in the coating may be 2 to 10 wt %, preferably at least 2.5 wt %, more preferably at least 3 wt %, and preferably at most 6 wt %, more preferably at most 5 wt %, of the total amount of tin and silver in the coating. The silver in this case is substantially in the silver-rich precipitations on the outer surface of the coating, whereas the tin is bound both in the intermetallic phases which are substantially $Cu_3Sn$ and $Cu_6Sn_5$ and in the silver-rich precipitations. If the fraction of silver is below 2 wt %, the silver-rich precipitations at the outer surface of the material are not formed to a sufficient extent. If the fraction of silver is more than 10 wt %, the coating is no longer of economic interest.

The invention is elucidated in more detail using schematic drawings and surface pictures.

DETAILED DESCRIPTION OF THE PREFERRED EMBODIMENTS

Parts corresponding to one another are provided with the same reference symbols in all of the figures.

Figure 1:
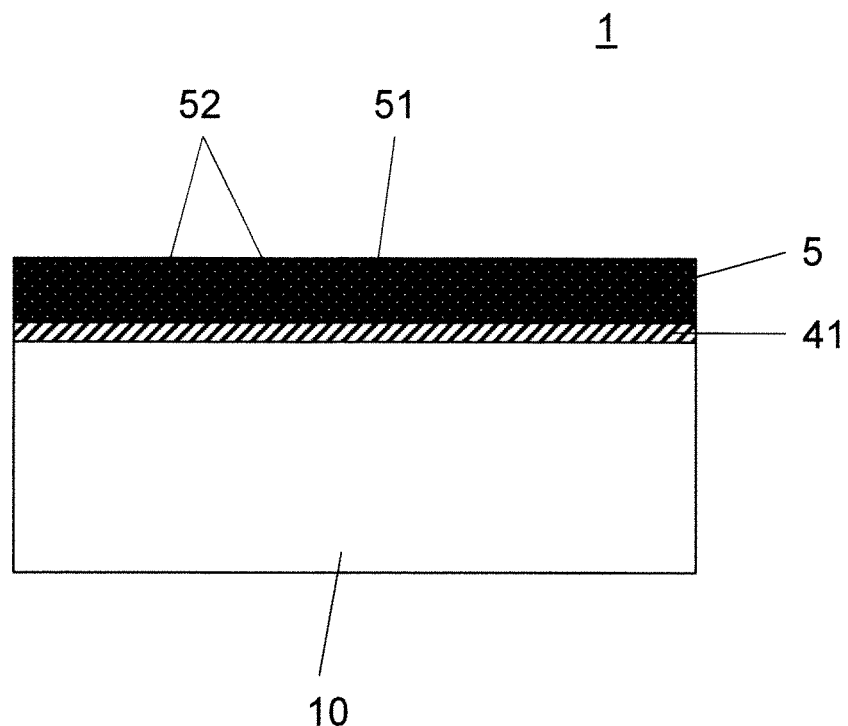
FIG. 1 shows a cross section of a material with a tin-silver layer according to the prior art

FIG. 1 shows schematically a cross section through a material 1 having a layer 5, known from the prior art, composed of a tin-silver alloy with approximately 4 wt % of silver. The layer 5 was applied to the substrate 10 by hot-dip galvanization. The layer 5 consists of a matrix of free tin 51 and finely distributed $Ag_3Sn$ precipitations 52 embedded therein. In FIG. 1, these finely distributed $Ag_3Sn$ precipitations 52 are represented symbolically by the white dotting of the layer 5, whereas the tin 51 is represented by the black background. During the hot-dip galvanization itself, tin is transformed, at the interface between substrate 10 and the tin-silver alloy layer 5, into a relatively thin, tin-rich, intermetallic phase 41 having the composition $Cu_6Sn_5$.

Figure 2:
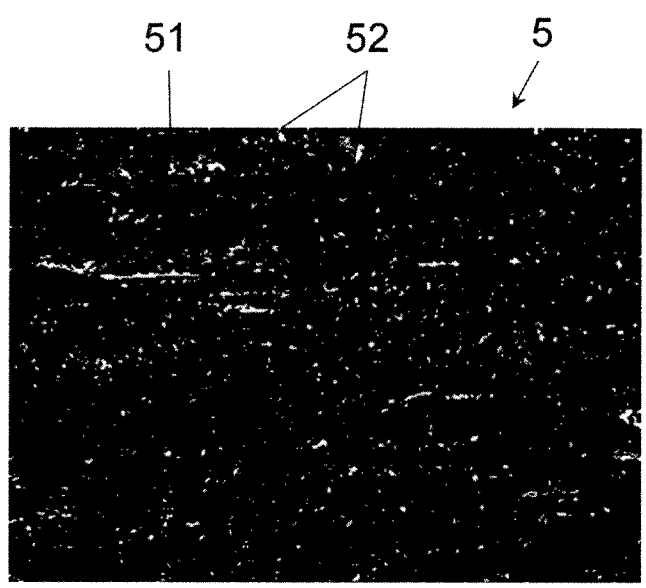
FIG. 2 shows an SEM picture of the surface of a tin-silver layer according to the prior art

FIG. 2 shows a picture generated using a scanning electron microscope (SEM picture) of the surface of a tin-silver layer 5 according to the prior art. FIG. 2 therefore represents, so to speak, the outer surface of the material 1 of FIG. 1. The $Ag_3Sn$ precipitations 52 are apparent as small light dots or regions, which are present in fine distribution in the darkly represented matrix of free tin 51. The area fraction of the $Ag_3Sn$ precipitations 52 is approximately 4%. The size of the majority of the $Ag_3Sn$ precipitations 52 is below 0.3 μm.

Figure 3:
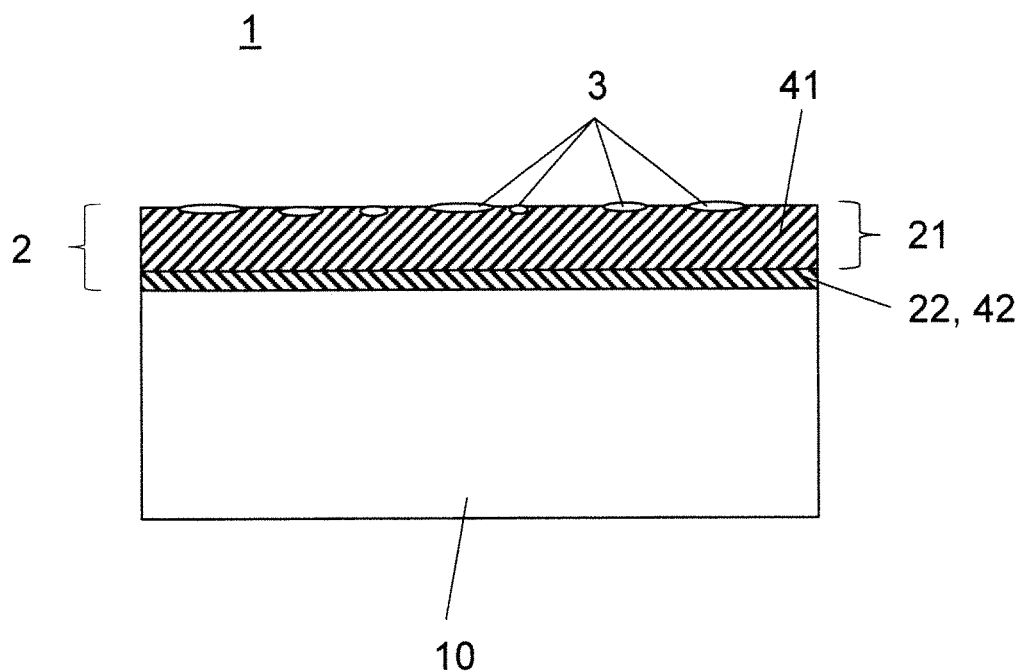
FIG. 3 shows a cross section of a material with a coating according to the invention

FIG. 3 shows schematically a cross section through a material 1 having a coating 2 according to the invention. The coating 2 has an outer layer 21 and an interlayer 22 composed of copper-rich intermetallic phase 42 $Cu_3Sn$, which is located between the substrate 10 and the outer layer 21. The outer layer 21 contains intermetallic phase 41 with the composition $Cu_6Sn_5$. Located on the surface of the outermost layer 21 facing away from the substrate 10 are insular, silver-rich precipitations 3. These precipitations 3 are embedded at least partly in the outermost zone of the intermetallic phase 41. They partially protrude beyond the outer surface of the intermetallic phase 41.

Figure 4:
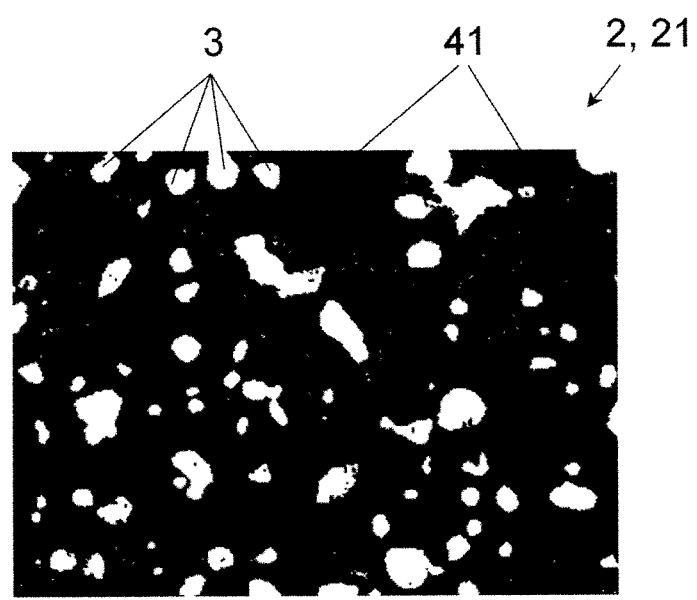
FIG. 4 shows an SEM picture of the surface of a coating according to the invention.

FIG. 4 shows a picture generated using a scanning electron microscope (SEM picture) of the surface of the outermost layer 21 of a coating 2 according to the invention. FIG. 4 therefore represents, so to speak, the outer surface of the material 1 of FIG. 3. The silver-rich precipitations 3 are apparent as light regions which are arranged like islands on the darkly represented intermetallic phase 41. The area fraction of the silver-rich precipitations 3 is approximately 11%. The size of the majority of the silver-rich precipitations 3 is between 0.4 and 3 μm.

The coating represented in FIG. 4 was produced by subjecting the material 1 represented in FIG. 2, having a 3 μm layer of a tin-silver alloy with 4 wt % of silver, to a heat treatment at 200° C. for a duration of 30 hours. In laboratory experiments which imitate the use of the material as a plug-in connector, a coating produced in this way exhibits a contact resistance which is approximately at the same low level as that of a tin-silver layer which has not been subjected to any heat treatment. On the other hand, the insertion forces and pulling forces ascertained for the coating according to the invention were up to 25% lower than those ascertained on a non-heat-treated sample.

LIST OF REFERENCE SYMBOLS 1 material
10 substrate
2 coating
21 outermost layer
22 interlayer
3 silver-rich precipitations
41 intermetallic phase
42 copper-rich intermetallic phase
5 layer of tin-silver alloy
51 tin
52 $Ag_3Sn$ precipitations

The invention claimed is:

1. An electrically conducting material comprising a substrate composed of copper or a copper alloy, and a coating composed of at least one layer, where the coating has an outermost layer comprising at least 90 vol % of an intermetallic phase which is substantially $Cu_6Sn_5$,
wherein the surface of the outermost layer that faces away from the substrate has insular, silver-rich precipitations with an area fraction of 7 to 20%.

2. The electrically conducting material according to claim 1, wherein more than 50% of the area fraction of the insular, silver-rich precipitations is formed by precipitations which have a size of at least 0.4 μm.

3. The electrically conducting material according to claim 1, wherein between the outermost layer and the substrate there is an interlayer which comprises a copper-rich intermetallic phase.

4. The electrically conducting material according to claim 3, wherein the coating consists of the interlayer and of the outermost layer with the insular, silver-rich precipitations.

5. The electrically conducting material according to claim 1, wherein the fraction of silver in the coating is 2 to 10 wt % of the total amount of tin and silver in the coating.

6. The electrically conducting material according to claim 3, wherein the copper-rich intermetallic phase is or comprises $Cu_3Sn$.

* * * * *